US009245556B2

(12) United States Patent
Brunnett et al.

(10) Patent No.: US 9,245,556 B2
(45) Date of Patent: Jan. 26, 2016

(54) DISK DRIVE EMPLOYING MULTIPLE READ ELEMENTS TO INCREASE RADIAL BAND FOR TWO-DIMENSIONAL MAGNETIC RECORDING

(71) Applicant: Western Digital Technologies, Inc., Irvine, CA (US)

(72) Inventors: Donald Brunnett, Pleasanton, CA (US); Gerardo A. Bertero, Redwood City, CA (US); Shaoping Li, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/203,358

(22) Filed: Mar. 10, 2014

(65) Prior Publication Data

US 2015/0255099 A1 Sep. 10, 2015

(51) Int. Cl.
*G11B 21/02* (2006.01)
*G11B 5/49* (2006.01)

(52) U.S. Cl.
CPC .................................... *G11B 5/4969* (2013.01)

(58) Field of Classification Search
None
See application file for complete search history.

(56) References Cited

U.S. PATENT DOCUMENTS 3,780,266 A 12/1973 Mudsam et al.
4,007,493 A * 2/1977 Behr et al. ................ 360/77.07
4,012,781 A 3/1977 Lin
4,152,736 A * 5/1979 Jansen et al. ............... 360/78.04
4,462,053 A * 7/1984 Lum et al. .................. 360/78.06
4,589,038 A * 5/1986 Radtke ............................ 360/79
4,597,023 A 6/1986 Rijckaert
4,729,048 A * 3/1988 Imakoshi et al. .......... 360/234.7
4,903,151 A * 2/1990 Mizukami et al. ......... 360/78.01
5,010,430 A * 4/1991 Yamada et al. ............ 360/235.4
5,229,901 A 7/1993 Mallary
5,270,892 A 12/1993 Naberhuis
5,309,305 A 5/1994 Nepela et al.
5,321,557 A 6/1994 Shimotashiro et al.
5,353,176 A 10/1994 Kosuge
5,388,014 A 2/1995 Brug et al.
5,508,868 A 4/1996 Cheng et al.
5,523,904 A 6/1996 Saliba
5,684,658 A 11/1997 Shi et al.
5,696,654 A 12/1997 Gill et al.
5,721,008 A 2/1998 Huang et al.
5,796,535 A 8/1998 Tuttle et al.
5,831,888 A 11/1998 Glover
5,912,779 A * 6/1999 Llewellyn et al. .............. 360/55
(Continued)

OTHER PUBLICATIONS

Michael L. Mallary, et al. U.S. Appl. No. 14/099,849, filed Oct. 11, 2013, 38 pages.
(Continued)

*Primary Examiner* — K. Wong

(57) ABSTRACT

A disk drive is disclosed comprising a disk comprising a plurality of tracks, and a head comprising at least three read elements including a first read element, a second read element, and a third read element. When the head is within a first radial band of the disk, data recorded on the disk is detected using the first read element and the second read element. When the head is within a second radial band of the disk different from the first radial band, data recorded on the disk is detected using the first read element and the third read element. The first read element is substantially aligned down-track with the third read element when the head is over a first radial location of the disk.

24 Claims, 7 Drawing Sheets

(56) References Cited

U.S. PATENT DOCUMENTS 5,963,400 A 10/1999 Cates et al.
6,018,789 A 1/2000 Sokolov et al.
6,021,024 A 2/2000 Akiyama et al.
6,065,095 A 5/2000 Sokolov et al.
6,071,007 A 6/2000 Schaenzer et al.
6,078,452 A 6/2000 Kittilson et al.
6,081,447 A 6/2000 Lofgren et al.
6,092,149 A 7/2000 Hicken et al.
6,092,150 A 7/2000 Sokolov et al.
6,094,707 A 7/2000 Sokolov et al.
6,104,562 A 8/2000 Ottesen et al.
6,105,104 A 8/2000 Guttmann et al.
6,111,717 A 8/2000 Cloke et al.
6,145,052 A 11/2000 Howe et al.
6,154,335 A 11/2000 Smith et al.
6,157,510 A 12/2000 Schreck et al.
6,175,893 B1 1/2001 D'Souza et al.
6,178,056 B1 1/2001 Cloke et al.
6,191,909 B1 2/2001 Cloke et al.
6,191,925 B1 2/2001 Watson
6,195,218 B1 2/2001 Guttmann et al.
6,205,494 B1 3/2001 Williams
6,208,477 B1 3/2001 Cloke et al.
6,216,242 B1 4/2001 Schaenzer
6,223,303 B1 4/2001 Billings et al.
6,230,233 B1 5/2001 Lofgren et al.
6,246,346 B1 6/2001 Cloke et al.
6,249,393 B1 6/2001 Billings et al.
6,256,695 B1 7/2001 Williams
6,262,857 B1 7/2001 Hull et al.
6,263,459 B1 7/2001 Schibilla
6,271,998 B1 8/2001 Coehoorn et al.
6,272,694 B1 8/2001 Weaver et al.
6,278,568 B1 8/2001 Cloke et al.
6,279,089 B1 8/2001 Schibilla et al.
6,289,484 B1 9/2001 Rothberg et al.
6,292,912 B1 9/2001 Cloke et al.
6,310,740 B1 10/2001 Dunbar et al.
6,311,551 B1 11/2001 Boutaghou
6,317,850 B1 11/2001 Rothberg
6,327,106 B1 12/2001 Rothberg
6,337,778 B1 1/2002 Gagne
6,341,102 B1 1/2002 Sato et al.
6,369,969 B1 4/2002 Christiansen et al.
6,369,982 B2 4/2002 Saliba
6,373,648 B2 * 4/2002 O'Connor ...................... 360/63
6,384,999 B1 5/2002 Schibilla
6,388,833 B1 5/2002 Golowka et al.
6,405,342 B1 6/2002 Lee
6,408,357 B1 6/2002 Hanmann et al.
6,408,406 B1 6/2002 Parris
6,411,452 B1 6/2002 Cloke
6,411,458 B1 6/2002 Billings et al.
6,412,083 B1 6/2002 Rothberg et al.
6,415,349 B1 7/2002 Hull et al.
6,425,128 B1 7/2002 Krapf et al.
6,441,981 B1 8/2002 Cloke et al.
6,442,328 B1 8/2002 Elliott et al.
6,445,524 B1 9/2002 Nazarian et al.
6,449,131 B2 9/2002 Guo et al.
6,449,767 B1 9/2002 Krapf et al.
6,453,115 B1 9/2002 Boyle
6,462,541 B1 10/2002 Wang et al.
6,469,878 B1 10/2002 Mack et al.
6,470,420 B1 10/2002 Hospodor
6,480,020 B1 11/2002 Jung et al.
6,480,349 B1 11/2002 Kim et al.
6,480,932 B1 11/2002 Vallis et al.
6,483,986 B1 11/2002 Krapf
6,487,032 B1 11/2002 Cloke et al.
6,490,635 B1 12/2002 Holmes
6,493,173 B1 12/2002 Kim et al.
6,496,333 B1 12/2002 Han et al.
6,499,083 B1 12/2002 Hamlin
6,519,104 B1 2/2003 Cloke et al.
6,525,892 B1 2/2003 Dunbar et al.
6,545,830 B1 4/2003 Briggs et al.
6,546,489 B1 4/2003 Frank, Jr. et al.
6,550,021 B1 4/2003 Dalphy et al.
6,552,880 B1 4/2003 Dunbar et al.
6,553,457 B1 4/2003 Wilkins et al.
6,578,106 B1 6/2003 Price
6,580,573 B1 6/2003 Hull et al.
6,594,183 B1 7/2003 Lofgren et al.
6,600,620 B1 7/2003 Krounbi et al.
6,601,137 B1 7/2003 Castro et al.
6,603,622 B1 8/2003 Christiansen et al.
6,603,625 B1 8/2003 Hospodor et al.
6,604,220 B1 8/2003 Lee
6,606,682 B1 8/2003 Dang et al.
6,606,714 B1 8/2003 Thelin
6,606,717 B1 8/2003 Yu et al.
6,611,393 B1 8/2003 Nguyen et al.
6,615,312 B1 9/2003 Hamlin et al.
6,639,748 B1 10/2003 Christiansen et al.
6,647,481 B1 11/2003 Luu et al.
6,654,193 B1 11/2003 Thelin
6,657,810 B1 12/2003 Kupferman
6,661,591 B1 12/2003 Rothberg
6,665,772 B1 12/2003 Hamlin
6,674,618 B2 1/2004 Engel et al.
6,687,073 B1 2/2004 Kupferman
6,687,078 B1 2/2004 Kim
6,687,850 B1 2/2004 Rothberg
6,690,523 B1 2/2004 Nguyen et al.
6,690,882 B1 2/2004 Hanmann et al.
6,691,198 B1 2/2004 Hamlin
6,691,213 B1 2/2004 Luu et al.
6,691,255 B1 2/2004 Rothberg et al.
6,693,760 B1 2/2004 Krounbi et al.
6,694,477 B1 2/2004 Lee
6,697,914 B1 2/2004 Hospodor et al.
6,704,153 B1 3/2004 Rothberg et al.
6,708,251 B1 3/2004 Boyle et al.
6,710,951 B1 3/2004 Cloke
6,711,628 B1 3/2004 Thelin
6,711,635 B1 3/2004 Wang
6,711,660 B1 3/2004 Milne et al.
6,715,044 B2 3/2004 Lofgren et al.
6,724,982 B1 4/2004 Hamlin
6,725,329 B1 4/2004 Ng et al.
6,735,650 B1 5/2004 Rothberg
6,735,693 B1 5/2004 Hamlin
6,744,772 B1 6/2004 Eneboe et al.
6,745,283 B1 6/2004 Dang
6,751,402 B1 6/2004 Elliott et al.
6,757,481 B1 6/2004 Nazarian et al.
6,772,281 B2 8/2004 Hamlin
6,781,826 B1 8/2004 Goldstone et al.
6,782,449 B1 8/2004 Codilian et al.
6,791,779 B1 9/2004 Singh et al.
6,792,486 B1 9/2004 Hanan et al.
6,799,274 B1 9/2004 Hamlin
6,811,427 B2 11/2004 Garrett et al.
6,826,003 B1 11/2004 Subrahmanyam
6,826,614 B1 11/2004 Hanmann et al.
6,832,041 B1 12/2004 Boyle
6,832,929 B2 12/2004 Garrett et al.
6,842,312 B1 1/2005 Alstrin et al.
6,845,405 B1 1/2005 Thelin
6,845,427 B1 1/2005 Atai-Azimi
6,850,443 B2 2/2005 Lofgren et al.
6,851,055 B1 2/2005 Boyle et al.
6,851,063 B1 2/2005 Boyle et al.
6,853,731 B1 2/2005 Boyle et al.
6,854,022 B1 2/2005 Thelin
6,862,660 B1 3/2005 Wilkins et al.
6,880,043 B1 4/2005 Castro et al.
6,882,486 B1 4/2005 Kupferman
6,884,085 B1 4/2005 Goldstone
6,888,831 B1 5/2005 Hospodor et al.
6,892,217 B1 5/2005 Hanmann et al.
6,892,249 B1 5/2005 Codilian et al.
6,892,313 B1 5/2005 Codilian et al.

(56) References Cited

U.S. PATENT DOCUMENTS 6,895,455 B1 5/2005 Rothberg
6,895,500 B1 5/2005 Rothberg
6,898,730 B1 5/2005 Hanan
6,910,099 B1 6/2005 Wang et al.
6,921,592 B2 7/2005 Tani et al.
6,928,470 B1 8/2005 Hamlin
6,931,439 B1 8/2005 Hanmann et al.
6,934,104 B1 8/2005 Kupferman
6,934,713 B2 8/2005 Schwartz et al.
6,940,873 B2 9/2005 Boyle et al.
6,943,978 B1 9/2005 Lee
6,947,247 B2 9/2005 Schwarz et al.
6,948,165 B1 9/2005 Luu et al.
6,950,267 B1 9/2005 Liu et al.
6,954,733 B1 10/2005 Ellis et al.
6,961,814 B1 11/2005 Thelin et al.
6,965,489 B1 11/2005 Lee et al.
6,965,563 B1 11/2005 Hospodor et al.
6,965,966 B1 11/2005 Rothberg et al.
6,967,799 B1 11/2005 Lee
6,968,422 B1 11/2005 Codilian et al.
6,968,450 B1 11/2005 Rothberg et al.
6,973,495 B1 12/2005 Milne et al.
6,973,570 B1 12/2005 Hamlin
6,976,190 B1 12/2005 Goldstone
6,983,316 B1 1/2006 Milne et al.
6,986,007 B1 1/2006 Procyk et al.
6,986,154 B1 1/2006 Price et al.
6,987,408 B2 1/2006 Kim
6,995,933 B1 2/2006 Codilian et al.
6,996,501 B1 2/2006 Rothberg
6,996,669 B1 2/2006 Dang et al.
7,002,777 B2 2/2006 Ogawa et al.
7,002,926 B1 2/2006 Eneboe et al.
7,003,674 B1 2/2006 Hamlin
7,006,316 B1 2/2006 Sargenti, Jr. et al.
7,009,820 B1 3/2006 Hogg
7,023,639 B1 4/2006 Kupferman
7,024,491 B1 4/2006 Hanmann et al.
7,024,549 B1 4/2006 Luu et al.
7,024,614 B1 4/2006 Thelin et al.
7,027,716 B1 4/2006 Boyle et al.
7,028,174 B1 4/2006 Atai-Azimi et al.
7,031,902 B1 4/2006 Catiller
7,046,465 B1 5/2006 Kupferman
7,046,488 B1 5/2006 Hogg
7,050,252 B1 5/2006 Vallis
7,054,937 B1 5/2006 Milne et al.
7,055,000 B1 5/2006 Severtson
7,055,167 B1 5/2006 Masters
7,057,836 B1 6/2006 Kupferman
7,062,398 B1 6/2006 Rothberg
7,075,746 B1 7/2006 Kupferman
7,076,604 B1 7/2006 Thelin
7,082,494 B1 7/2006 Thelin et al.
7,088,538 B1 8/2006 Codilian et al.
7,088,545 B1 8/2006 Singh et al.
7,092,186 B1 8/2006 Hogg
7,095,577 B1 8/2006 Codilian et al.
7,099,095 B1 8/2006 Subrahmanyam et al.
7,106,537 B1 9/2006 Bennett
7,106,549 B2 9/2006 Asakura
7,106,947 B2 9/2006 Boyle et al.
7,110,202 B1 9/2006 Vasquez
7,111,116 B1 9/2006 Boyle et al.
7,114,029 B1 9/2006 Thelin
7,120,737 B1 10/2006 Thelin
7,120,806 B1 10/2006 Codilian et al.
7,126,776 B1 10/2006 Warren, Jr. et al.
7,129,763 B1 10/2006 Bennett et al.
7,133,600 B1 11/2006 Boyle
7,136,244 B1 11/2006 Rothberg
7,146,094 B1 12/2006 Boyle
7,149,046 B1 12/2006 Coker et al.
7,150,036 B1 12/2006 Milne et al.
7,155,616 B1 12/2006 Hamlin
7,171,108 B1 1/2007 Masters et al.
7,171,110 B1 1/2007 Wilshire
7,193,807 B1 3/2007 Liikanen et al.
7,194,576 B1 3/2007 Boyle
7,200,698 B1 4/2007 Rothberg
7,205,805 B1 4/2007 Bennett
7,206,497 B1 4/2007 Boyle et al.
7,215,496 B1 5/2007 Kupferman et al.
7,215,514 B1 5/2007 Yang et al.
7,215,771 B1 5/2007 Hamlin
7,237,054 B1 6/2007 Cain et al.
7,239,465 B1 7/2007 Watson et al.
7,240,161 B1 7/2007 Boyle
7,242,547 B2 7/2007 Ogawa
7,249,365 B1 7/2007 Price et al.
7,259,927 B2 * 8/2007 Harris ............................ 360/48
7,263,709 B1 8/2007 Krapf
7,271,970 B2 9/2007 Tsuchiya
7,274,639 B1 9/2007 Codilian et al.
7,274,659 B2 9/2007 Hospodor
7,275,116 B1 9/2007 Hanmann et al.
7,280,302 B1 10/2007 Masiewicz
7,292,774 B1 11/2007 Masters et al.
7,292,775 B1 11/2007 Boyle et al.
7,296,284 B1 11/2007 Price et al.
7,302,501 B1 11/2007 Cain et al.
7,302,579 B1 11/2007 Cain et al.
7,318,088 B1 1/2008 Mann
7,319,806 B1 1/2008 Willner et al.
7,324,303 B2 1/2008 Ozue et al.
7,325,244 B2 1/2008 Boyle et al.
7,330,323 B1 2/2008 Singh et al.
7,346,790 B1 3/2008 Klein
7,366,641 B1 4/2008 Masiewicz et al.
7,369,340 B1 5/2008 Dang et al.
7,369,343 B1 5/2008 Yeo et al.
7,372,650 B1 5/2008 Kupferman
7,380,147 B1 5/2008 Sun
7,382,585 B1 6/2008 Nibarger et al.
7,392,340 B1 6/2008 Dang et al.
7,404,013 B1 7/2008 Masiewicz
7,405,907 B2 7/2008 Raastad
7,406,545 B1 7/2008 Rothberg et al.
7,408,730 B2 8/2008 Yamagishi
7,415,571 B1 8/2008 Hanan
7,420,758 B2 9/2008 Inoue et al.
7,436,610 B1 10/2008 Thelin
7,436,632 B2 10/2008 Li et al.
7,437,502 B1 10/2008 Coker
7,440,214 B1 10/2008 Ell et al.
7,451,344 B1 11/2008 Rothberg
7,453,671 B1 11/2008 Nibarger et al.
7,471,483 B1 12/2008 Ferris et al.
7,471,486 B1 12/2008 Coker et al.
7,486,060 B1 2/2009 Bennett
7,496,493 B1 2/2009 Stevens
7,502,193 B2 3/2009 Albrecht et al.
7,518,819 B1 4/2009 Yu et al.
7,526,184 B1 4/2009 Parkinen et al.
7,539,924 B1 5/2009 Vasquez et al.
7,543,117 B1 6/2009 Hanan
7,551,383 B1 6/2009 Kupferman
7,551,393 B2 6/2009 Biskeborn et al.
7,562,282 B1 7/2009 Rothberg
7,577,973 B1 8/2009 Kapner, III et al.
7,596,797 B1 9/2009 Kapner, III et al.
7,599,139 B1 10/2009 Bombet et al.
7,602,193 B1 10/2009 Baird et al.
7,619,841 B1 11/2009 Kupferman
7,647,544 B1 1/2010 Masiewicz
7,649,704 B1 1/2010 Bombet et al.
7,652,847 B2 1/2010 Weiss et al.
7,653,927 B1 1/2010 Kapner, III et al.
7,656,603 B1 2/2010 Xing
7,656,610 B1 2/2010 Campos et al.
7,656,763 B1 2/2010 Jin et al.
7,657,149 B2 2/2010 Boyle
7,672,072 B1 3/2010 Boyle et al.

(56) References Cited

U.S. PATENT DOCUMENTS 7,673,075 B1 3/2010 Masiewicz
7,688,540 B1 3/2010 Mei et al.
7,724,461 B1 5/2010 McFadyen et al.
7,725,584 B1 5/2010 Hanmann et al.
7,730,295 B1 6/2010 Lee
7,755,863 B2 7/2010 Neumann et al.
7,760,458 B1 7/2010 Trinh
7,768,776 B1 8/2010 Szeremeta et al.
7,804,657 B1 9/2010 Hogg et al.
7,813,954 B1 10/2010 Price et al.
7,827,320 B1 11/2010 Stevens
7,839,588 B1 11/2010 Dang et al.
7,843,660 B1 11/2010 Yeo
7,852,596 B2 12/2010 Boyle et al.
7,859,782 B1 12/2010 Lee
7,872,822 B1 1/2011 Rothberg
7,898,756 B1 3/2011 Wang
7,898,762 B1 3/2011 Guo et al.
7,900,037 B1 3/2011 Fallone et al.
7,907,364 B2 3/2011 Boyle et al.
7,929,234 B1 4/2011 Boyle et al.
7,933,087 B1 4/2011 Tsai et al.
7,933,090 B1 4/2011 Jung et al.
7,934,030 B1 4/2011 Sargenti, Jr. et al.
7,940,491 B2 5/2011 Szeremeta et al.
7,944,639 B1 5/2011 Wang
7,945,727 B2 5/2011 Rothberg et al.
7,949,564 B1 5/2011 Hughes et al.
7,974,029 B2 7/2011 Tsai et al.
7,974,039 B1 7/2011 Xu et al.
7,982,993 B1 7/2011 Tsai et al.
7,984,200 B1 7/2011 Bombet et al.
7,990,648 B1 8/2011 Wang
7,992,179 B1 8/2011 Kapner, III et al.
8,004,785 B1 8/2011 Tsai et al.
8,006,027 B1 8/2011 Stevens et al.
8,009,388 B2 8/2011 Oh et al.
8,014,094 B1 9/2011 Jin
8,014,977 B1 9/2011 Masiewicz et al.
8,019,914 B1 9/2011 Vasquez et al.
8,040,625 B1 10/2011 Boyle et al.
8,078,943 B1 12/2011 Lee
8,079,045 B2 12/2011 Krapf et al.
8,082,433 B1 12/2011 Fallone et al.
8,085,487 B1 12/2011 Jung et al.
8,089,719 B1 1/2012 Dakroub
8,090,902 B1 1/2012 Bennett et al.
8,090,906 B1 1/2012 Blaha et al.
8,091,112 B1 1/2012 Elliott et al.
8,094,396 B1 1/2012 Zhang et al.
8,094,401 B1 1/2012 Peng et al.
8,116,020 B1 2/2012 Lee
8,116,025 B1 2/2012 Chan et al.
8,134,793 B1 3/2012 Vasquez et al.
8,134,798 B1 3/2012 Thelin et al.
8,139,301 B1 * 3/2012 Li et al. .......................... 360/39
8,139,310 B1 3/2012 Hogg
8,144,419 B1 3/2012 Liu
8,144,424 B2 3/2012 Dugas et al.
8,145,452 B1 3/2012 Masiewicz et al.
8,149,528 B1 4/2012 Suratman et al.
8,154,812 B1 4/2012 Boyle et al.
8,159,768 B1 4/2012 Miyamura
8,161,328 B1 4/2012 Wilshire
8,164,849 B1 4/2012 Szeremeta et al.
8,174,780 B1 5/2012 Tsai et al.
8,190,575 B1 5/2012 Ong et al.
8,194,338 B1 6/2012 Zhang
8,194,340 B1 6/2012 Boyle et al.
8,194,341 B1 6/2012 Boyle
8,201,066 B1 6/2012 Wang
8,208,228 B2 6/2012 Maat et al.
8,271,692 B1 9/2012 Dinh et al.
8,279,550 B1 10/2012 Hogg
8,281,218 B1 10/2012 Ybarra et al.
8,285,923 B2 10/2012 Stevens
8,289,656 B1 10/2012 Huber
8,305,705 B1 11/2012 Roohr
8,307,156 B1 11/2012 Codilian et al.
8,310,775 B1 11/2012 Boguslawski et al.
8,315,006 B1 11/2012 Chahwan et al.
8,316,263 B1 11/2012 Gough et al.
8,320,067 B1 11/2012 Tsai et al.
8,324,974 B1 12/2012 Bennett
8,332,695 B2 12/2012 Dalphy et al.
8,339,919 B1 12/2012 Lee
8,341,337 B1 12/2012 Ong et al.
8,350,628 B1 1/2013 Bennett
8,356,184 B1 1/2013 Meyer et al.
8,370,683 B1 2/2013 Ryan et al.
8,375,225 B1 2/2013 Ybarra
8,375,274 B1 2/2013 Bonke
8,380,922 B1 2/2013 DeForest et al.
8,390,948 B2 3/2013 Hogg
8,390,952 B1 3/2013 Szeremeta
8,392,689 B1 3/2013 Lott
8,407,393 B1 3/2013 Yolar et al.
8,413,010 B1 4/2013 Vasquez et al.
8,417,566 B2 4/2013 Price et al.
8,421,663 B1 4/2013 Bennett
8,422,172 B1 4/2013 Dakroub et al.
8,427,770 B1 4/2013 O'Dell et al.
8,427,771 B1 4/2013 Tsai
8,429,343 B1 4/2013 Tsai
8,433,937 B1 4/2013 Wheelock et al.
8,433,977 B1 4/2013 Vasquez et al.
8,441,909 B1 5/2013 Thayamballi et al.
8,456,980 B1 6/2013 Thayamballi
8,458,526 B2 6/2013 Dalphy et al.
8,462,466 B2 6/2013 Huber
8,467,151 B1 6/2013 Huber
8,483,027 B1 7/2013 Mak et al.
8,489,841 B1 7/2013 Strecke et al.
8,493,679 B1 7/2013 Boguslawski et al.
8,499,198 B1 7/2013 Messenger et al.
8,508,880 B2 8/2013 Gao et al.
8,514,506 B1 * 8/2013 Li et al. .......................... 360/39
8,554,741 B1 10/2013 Malina
8,560,759 B1 10/2013 Boyle et al.
8,576,509 B1 11/2013 Hogg
8,576,511 B1 11/2013 Coker et al.
8,578,100 B1 11/2013 Huynh et al.
8,578,242 B1 11/2013 Burton et al.
8,582,223 B1 11/2013 Garani et al.
8,582,231 B1 11/2013 Kermiche et al.
8,589,773 B1 11/2013 Wang et al.
8,593,753 B1 11/2013 Anderson
8,599,508 B1 12/2013 Burd
8,599,512 B2 12/2013 Hogg
8,605,379 B1 12/2013 Sun
8,611,031 B1 12/2013 Tan et al.
8,611,032 B2 12/2013 Champion et al.
8,612,798 B1 12/2013 Tsai
8,619,383 B1 12/2013 Jung et al.
8,619,508 B1 12/2013 Krichevsky et al.
8,619,529 B1 12/2013 Liew et al.
8,621,115 B1 12/2013 Bombet et al.
8,621,133 B1 12/2013 Boyle
8,625,224 B1 1/2014 Lin et al.
8,625,225 B1 1/2014 Wang
8,626,463 B2 1/2014 Stevens et al.
8,630,052 B1 1/2014 Jung et al.
8,631,188 B1 1/2014 Heath et al.
8,635,412 B1 1/2014 Wilshire
8,661,193 B1 2/2014 Cobos et al.
8,665,547 B1 3/2014 Yeo et al.
8,667,248 B1 3/2014 Neppalli
8,670,205 B1 3/2014 Malina et al.
8,671,250 B2 3/2014 Lee
8,681,442 B2 3/2014 Hogg
8,681,445 B1 3/2014 Kermiche et al.
8,683,295 B1 3/2014 Syu et al.
8,687,306 B1 4/2014 Coker et al.
8,687,307 B1 4/2014 Patton, III

(56) References Cited

U.S. PATENT DOCUMENTS

| | | | | |
|---|---|---|---|---|
| 8,687,313 | B2 | 4/2014 | Selvaraj | |
| 8,693,133 | B1 | 4/2014 | Lee et al. | |
| 8,698,492 | B1 | 4/2014 | Mak et al. | |
| 8,699,171 | B1 | 4/2014 | Boyle | |
| 8,699,172 | B1 | 4/2014 | Gunderson et al. | |
| 8,711,500 | B1 | 4/2014 | Fong et al. | |
| 8,711,506 | B1 | 4/2014 | Giovenzana et al. | |
| 8,711,517 | B2 | 4/2014 | Erden et al. | |
| 8,711,665 | B1 | 4/2014 | Abdul Hamid | |
| 8,717,694 | B1 | 5/2014 | Liew et al. | |
| 8,717,695 | B1 | 5/2014 | Lin et al. | |
| 8,730,612 | B1 | 5/2014 | Haralson | |
| 8,743,502 | B1 | 6/2014 | Bonke et al. | |
| 8,749,911 | B1 | 6/2014 | Sun et al. | |
| 8,786,987 | B2 | 7/2014 | Edelman et al. | |
| 8,861,114 | B1 * | 10/2014 | Burd | 360/45 |
| 8,988,812 | B1 * | 3/2015 | Brunnett et al. | 360/55 |
| 9,013,821 | B1 * | 4/2015 | Chen | 360/65 |
| 9,013,824 | B1 * | 4/2015 | Guo et al. | 360/75 |
| 2003/0002190 | A1 | 1/2003 | Teo et al. | |
| 2003/0026036 | A1 | 2/2003 | Chew | |
| 2003/0151855 | A1 | 8/2003 | Molstad et al. | |
| 2004/0184181 | A1 | 9/2004 | Fukuda et al. | |
| 2005/0036241 | A1 | 2/2005 | Tsuda et al. | |
| 2005/0036437 | A1 | 2/2005 | Learned et al. | |
| 2007/0242378 | A1 | 10/2007 | Ikegami et al. | |
| 2009/0113702 | A1 | 5/2009 | Hogg | |
| 2010/0020435 | A1 | 1/2010 | Chen et al. | |
| 2010/0306551 | A1 | 12/2010 | Meyer et al. | |
| 2011/0226729 | A1 | 9/2011 | Hogg | |
| 2012/0159042 | A1 | 6/2012 | Lott et al. | |
| 2012/0275050 | A1 | 11/2012 | Wilson et al. | |
| 2012/0281963 | A1 | 11/2012 | Krapf et al. | |
| 2012/0324980 | A1 | 12/2012 | Nguyen et al. | |
| 2013/0223199 | A1 | 8/2013 | Lund et al. | |
| 2013/0242428 | A1 | 9/2013 | Tetzlaff et al. | |
| 2013/0250447 | A1 | 9/2013 | Erden | |
| 2013/0286502 | A1 | 10/2013 | Erden et al. | |
| 2014/0160590 | A1 | 6/2014 | Sankaranarayanan et al. | |

OTHER PUBLICATIONS

Shaoping Li, et al. U.S. Appl. No. 13/928,799, filed May 21, 2013, 27 pages.

Donald Brunnett, et al. U.S. Appl. No. 14/325,643, filed Nov. 27, 2013, 27 pages.

Shaoping Li, et al. U.S. Appl. No. 14/097,157, filed Oct. 17, 2013, 38 pages.

Shaoping Li , et. al., U.S. Appl. No. 13/963,172, filed Aug. 8, 2013, 37 pages.

Paul E. Soderbloom, et. al., U.S. Appl. No. 14/264,244, filed Apr. 29, 2014, 24 pages.

Yiming Chen, et. al., U.S. Appl. No. 13/968,323, filed Aug. 15, 2013, 19 pages.

Donald Brunnett, et al., U.S. Appl. No. 14/304,347, 30 pgs.

Notice of Allowance dated Jul. 18, 2014 from U.S. Appl. No. 14/304,347, 9 pgs.

Notice of Allowance dated Nov. 7, 2014 from U.S. Appl. No. 14/304,347, 91 pgs.

* cited by examiner

DISK DRIVE EMPLOYING MULTIPLE READ ELEMENTS TO INCREASE RADIAL BAND FOR TWO-DIMENSIONAL MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $\mathbf{6}_0$-$\mathbf{6}_N$ recorded around the circumference of each servo track. Each servo sector $\mathbf{6}_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $\mathbf{6}_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

When reading data from the disk, a read channel typically samples the read signal to generate read signal samples that are equalized according to a target response (e.g., a partial response). A sequence detector (e.g., a Viterbi detector) detects an estimated data sequence from the equalized samples, and errors in the estimated data sequence are corrected, for example, using a Reed-Solomon error correction code (ECC) or using a Low Density Parity Check (LDPC) code.

DETAILED DESCRIPTION

Figure 1:
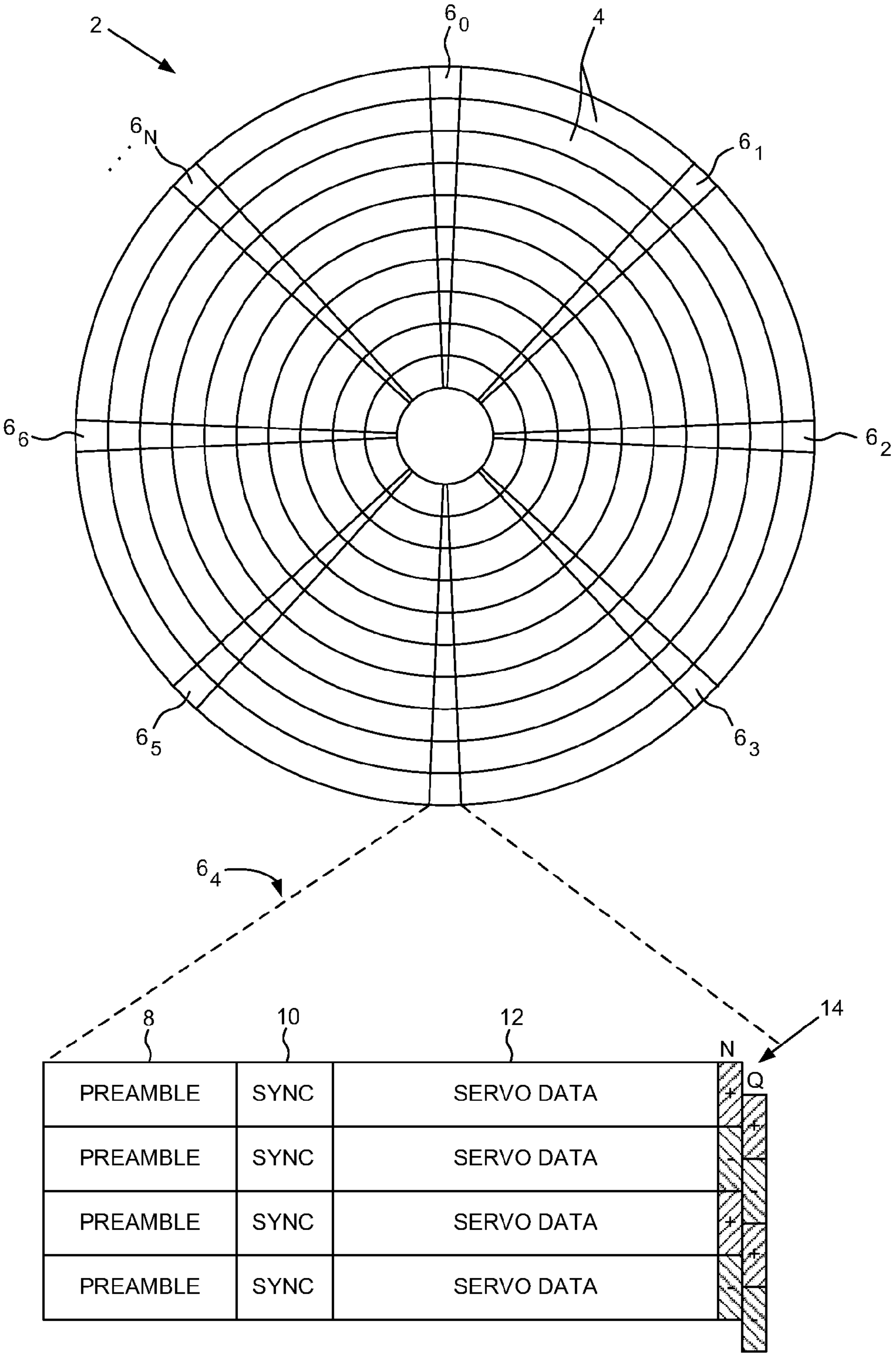
FIG. 1 shows a prior art disk format comprising a plurality of servo tracks defined by servo sectors.
Figures 2A, 2B, 2C:
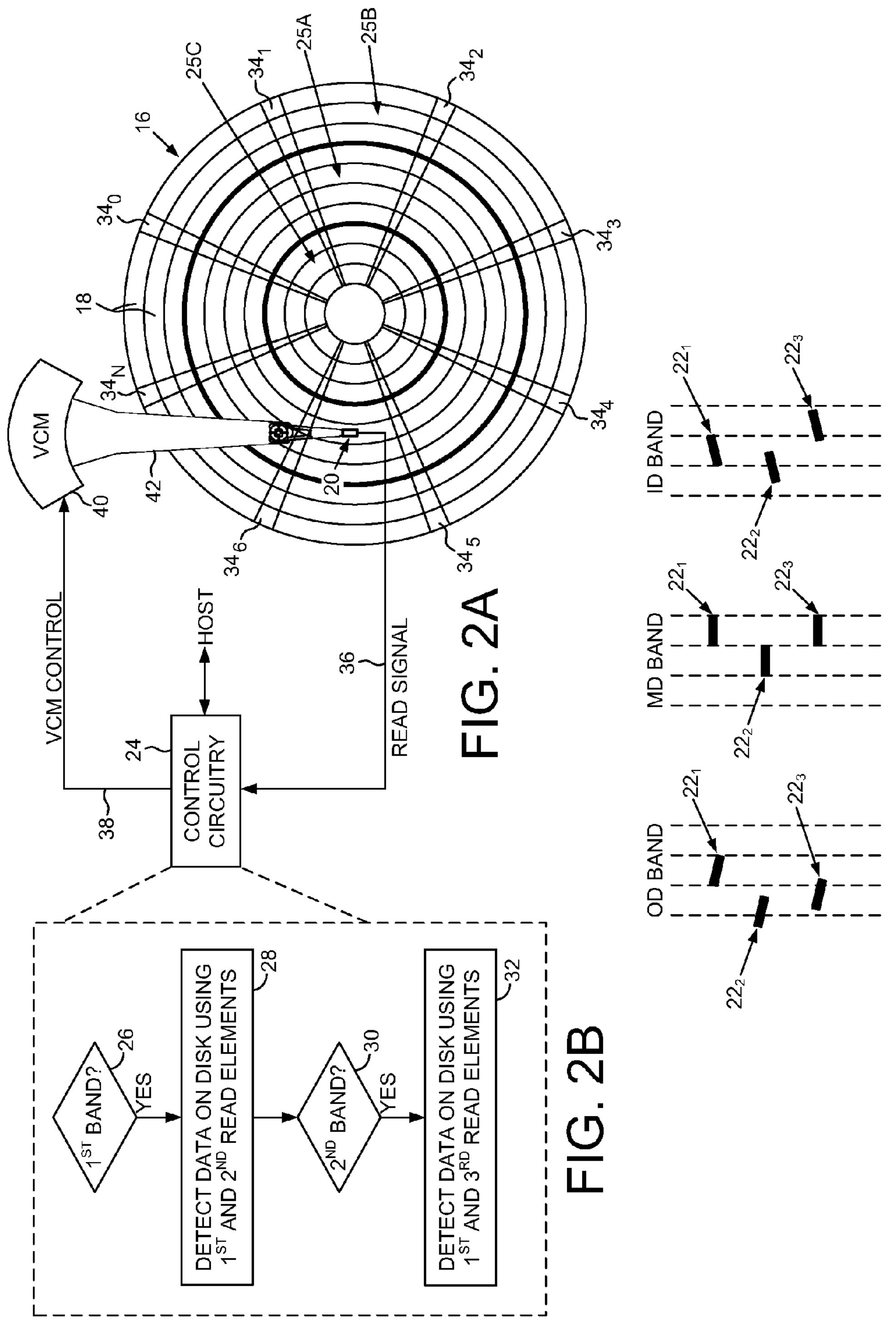
FIG. 2A shows a disk drive according to an embodiment comprising a disk having a plurality of tracks, and a head comprising at least three read elements including a first read element, a second read element, and a third read element.
FIG. 2B is a flow diagram according to an embodiment wherein when the head is within a first radial band of the disk, data recorded on the disk is detected using the first read element and the second read element, and when the head is within a second radial band of the disk, data recorded on the disk is detected using the first read element and the third read element.
FIG. 2C shows an embodiment wherein two of the three heads are used to read data from the disk depending on the skew angle of the head.

FIG. 2A shows a disk drive according to an embodiment comprising a disk 16 comprising a plurality of tracks 18, and a head 20 comprising at least three read elements including a first read element $\mathbf{22}_1$, a second read element $\mathbf{22}_2$, and a third read element $\mathbf{22}_3$ (FIG. 2C). The disk drive further comprises control circuitry 24 configured to execute the flow diagram of FIG. 2B, wherein when the head is within a first radial band 25A of the disk (block 26), data recorded on the disk is detected using the first read element and the second read element (block 28). When the head is within a second radial band 25B of the disk different from the first radial band (block 30), data recorded on the disk is detected using the first read element and the third read element (block 32). As shown in FIG. 2C, in one embodiment the first read element $\mathbf{22}_1$ is substantially aligned down-track with the third read element $22_3$ when the head 20 is over a first radial location of the disk 16 (e.g., near the middle diameter of the disk 16). In another embodiment, the control circuitry 24 selects two of the three read elements $22_1$-$22_3$ to detect user data recorded on the disk based on the radial location of the head (e.g., the radial band), while the unselected read element is not used to read the user data.

In the embodiment of FIG. 2A, a plurality of concentric servo tracks are defined by embedded servo sectors $34_0$-$34_N$, wherein a plurality of concentric data tracks 18 are defined relative to the servo tracks at the same or different radial density. The control circuitry 24 processes a read signal 36 emanating from at least one of the read elements to demodulate the servo sectors and generate a position error signal (PES) representing an error between the actual position of the head and a target position relative to a target track. The control circuitry 24 filters the PES using a suitable compensation filter to generate a control signal 38 applied to a voice coil motor (VCM) 40 which rotates an actuator arm 42 about a pivot in order to actuate the head 20 radially over the disk 16 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

Figures 3A, 3B, 3C:
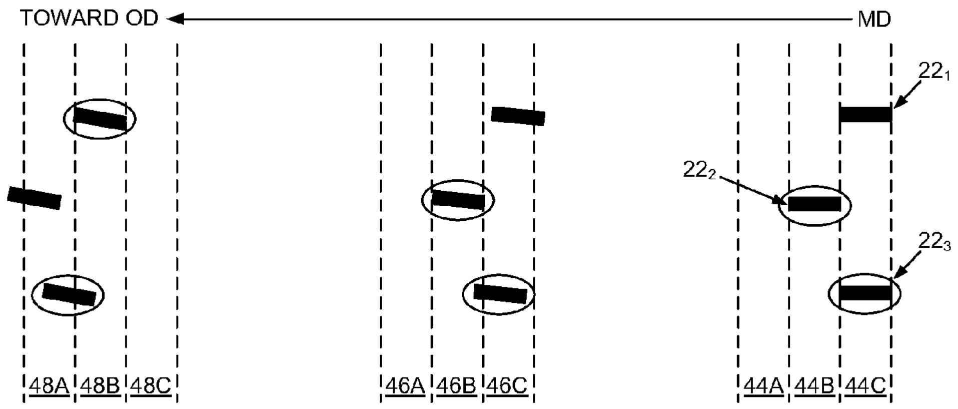
FIGS. 3A-3C show an embodiment wherein the second and third read elements are used to read data from the disk as the head moves from the middle diameter toward the outer diameter of the disk, and then the first and third read elements are used when the skew angle of the head exceeds a threshold relative to the track pitch of the data tracks.

In one embodiment, the read signal generated by at least two of the read elements are processed to detect data recorded in a target data track using a two-dimensional demodulation algorithm meaning that the inter-track interference (ITI) caused by at least one adjacent data track is compensated in order to detect the data recorded in the target data track. FIG. 3A illustrates an example of this embodiment wherein when the head 20 is at the middle diameter of the disk 16, the read signal generated by the second read element $22_2$ and the read signal generated by the third read element $22_3$ are processed to detect data recorded in the target data track 44B. That is, when detecting the data recorded in the target data track 44B, the ITI caused by the adjacent data track 44C is compensated by processing the read signal generated by the third read element $22_3$. The ITI compensation may be implemented in any suitable manner, such as by subtracting the read signal generated by the third read element $22_3$ from the read signal generated by the second read element $22_2$ in the analog or digital domain. In another embodiment, the control circuitry 24 may employ two-dimensional digital equalization followed by a suitable two-dimensional sequence detector (e.g., a trellis type sequence detector such as a Viterbi detector). In another embodiment, the control circuitry 24 may employ two-dimensional (2D) to one-dimensional (1D) or 2D-to-1D digital equalization followed by a suitable one-dimensional sequence detector. In still another embodiment, the control circuitry 24 may process the read signal generated by the third read element $22_3$ to detect a data sequence recorded in the adjacent data track 44C, convert the detected data sequence into ideal signal samples, and then subtract the ideal signal samples from the equalized signal samples of the read signal generated by the second read element $22_2$. The resulting compensated signal samples may then be processed using a suitable one-dimensional sequence detector. Although in the embodiment of FIG. 3A the second read element $22_2$ does not overlap the third read element $22_3$ when the head 20 is near the middle diameter of the disk, in another embodiment the read elements may be fabricated so there is a small amount of overlap which may improve the ITI compensation near the middle diameter of the disk.

Referring to FIG. 3B, as the head 20 moves toward the outer diameter of the disk 16, the skew angle of the head causes the third read element $22_3$ to overlap with the target data track 46B over which the second read element $22_2$ is positioned. That is, part of the third read element $22_3$ is over the target data track 46B, and part of the third read element $22_3$ is over the adjacent data track 46C. At this skew angle, the data recorded in the target data track may still be detected by processing the read signal generated by the second and third read elements $22_2$ and $22_3$. As the head 20 moves further toward the outer diameter of the disk 16 as illustrated in FIG. 3C, the overlap of the second and third read elements $22_2$ and $22_3$ becomes excessive. That is, there is a point (e.g., up to one-quarter of a data track) where using the third read element to compensate for ITI for the second read element begins to degrade due to an excessive overlap of the read elements within the target data track. Accordingly, in one embodiment when the head skew exceeds a threshold (i.e., when the head 20 is within a second radial band 25B of the disk 16 as shown in FIG. 2A), data recorded on the disk 16 is detected using the first read element $22_1$ and the third read element $22_3$ as shown in FIG. 3C. That is, the first read element $22_1$ is positioned over the target data track 48B and the third read element $22_3$ is positioned over an adjacent data track 48A such that the third read element $22_3$ is used to compensate for ITI when detecting the data recorded in the target data track 48B. In an alternative embodiment, the third read element $22_3$ may be positioned over the target data track 48B and the first read element $22_1$ used to compensate for ITI from the adjacent data track 48C. That is, the ITI may be compensated from the adjacent data track on either side of the target data track, and in one embodiment a retry operation may attempt to compensate for the ITI from each of the adjacent data tracks as well as from both of the adjacent data tracks (e.g., by buffering data during an initial revolution of the disk).

Figures 3D, 3E, 3F:
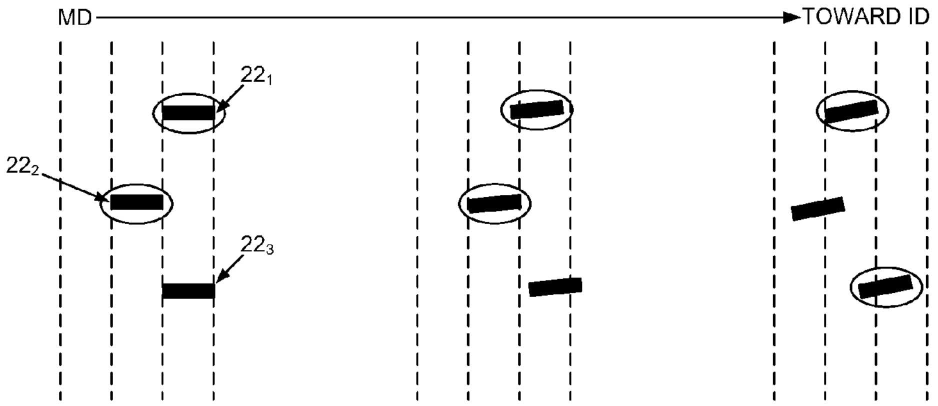
FIGS. 3D-3F show an embodiment wherein the first and second read elements are used to read data from the disk as the head moves from the middle diameter toward the inner diameter of the disk, and then the first and third read elements are used when the skew angle of the head exceeds a threshold relative to the track pitch of the data tracks.

FIGS. 3D-3F illustrate a similar toggling between read elements as the head moves from the middle diameter toward the inner diameter of the disk (i.e., when the head skew is reversed). In this embodiment, the read signals from the first and second read elements $22_1$ and $22_2$ are processed to detect data recorded in the target data track when the head is in the first band 25A of FIG. 2A as shown in FIGS. 3D and 3E, and then when the head transitions into the third band 25C toward the inner diameter of the disk as shown in FIG. 3F, the read signals from the first and third read elements $22_1$ and $22_3$ are processed to detect data recorded in the target data track.

In one embodiment, the control circuitry 24 may detect data recorded in a first data track and in a second data track. Referring again to the example embodiment shown in FIG. 3A, the control circuitry 24 may process the read signals from the second read element $22_2$ and from the third read element $22_3$ to detect data in both data track 44B and data track 44C. The control circuitry 24 may process the read signals to detect the data from either data track using a one-dimensional or two-dimensional algorithm. For example, in one embodiment the data may be detected in both data tracks using a two-dimensional demodulation algorithm wherein the ITI from each of the adjacent data tracks is compensated. In another embodiment, the data may be detected in one of the data tracks using a one-dimensional demodulation algorithm, whereas the data recorded in the other data track may be detected using a two-dimensional demodulation algorithm.

Figure 4A:
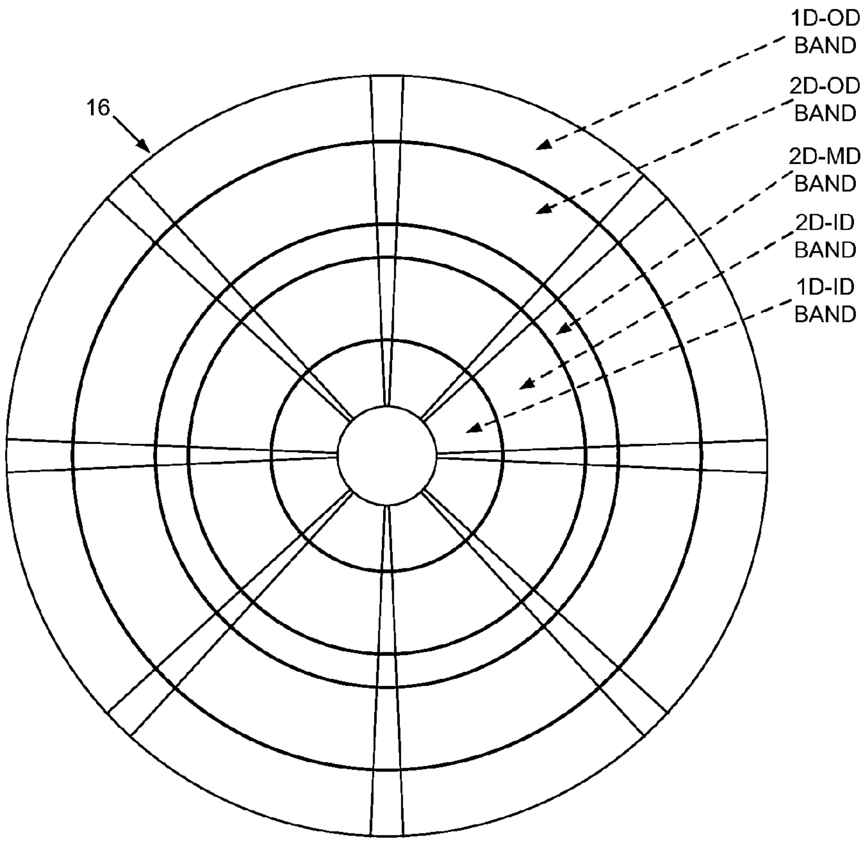
FIGS. 4A and 4B show an embodiment wherein data recorded on the disk is detected using a single head and a one-dimensional demodulation algorithm at the outer and inner diameter radial bands, and data is detected using two of the heads and a two-dimensional demodulation algorithm at the inner diameter radial bands.
Figure 4B:
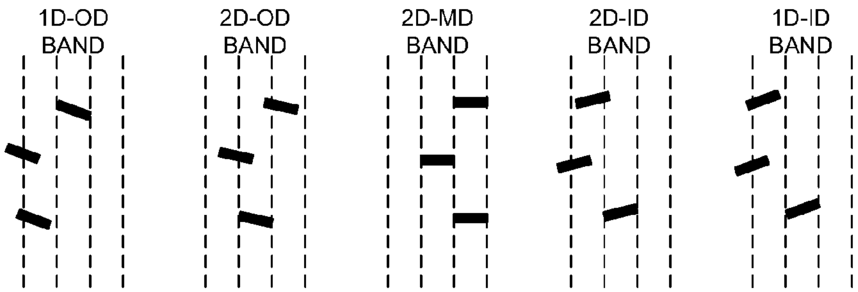

FIGS. 4A and 4B show an embodiment wherein when the skew angle of the head 20 exceeds a threshold toward the outer diameter and inner diameter of the disk, there may be insufficient overlap of a target data track by the first and third read elements $22_1$ and $22_3$. Accordingly, the disk 16 may comprise an outer diameter radial band of data tracks and an inner diameter radial band of data tracks where only one of the read elements is used to detect data recorded in a target data track. In the embodiment of FIG. 4B, the read signal generated by the first read element $\mathbf{22}_1$ is processed to detect data recorded in a target data track when the head 20 is in the outer most diameter band of data tracks (1D-OD BAND), and the read signal generated by the third read element $\mathbf{22}_3$ is processed to detect data recorded in a target data track when the head 20 is in the inner most diameter band of data tracks (1D-ID BAND). However, any one of the read elements be used to read data in the 1D-OD BAND and the 1D-ID band, including the second read element When the head is within one of the 1D-OD BAND or the 1D-ID BAND, the data recorded in a target data track is detected by processing the read signal using a one-dimensional demodulation algorithm meaning that the ITI from an adjacent data track is not compensated. When the head is within one of the 2D-OD BAND, the 2D-MD BAND, or the 2D-ID BAND, the data recorded in a target data track is detected by processing the first and second read signals using a two-dimensional demodulation algorithm. In one embodiment, the linear and/or the radial recording density of the data tracks in the 2D bands may be increased due to the improved accuracy of a two-dimensional demodulation algorithm as compared to a one-dimensional demodulation algorithm.

Figure 5:
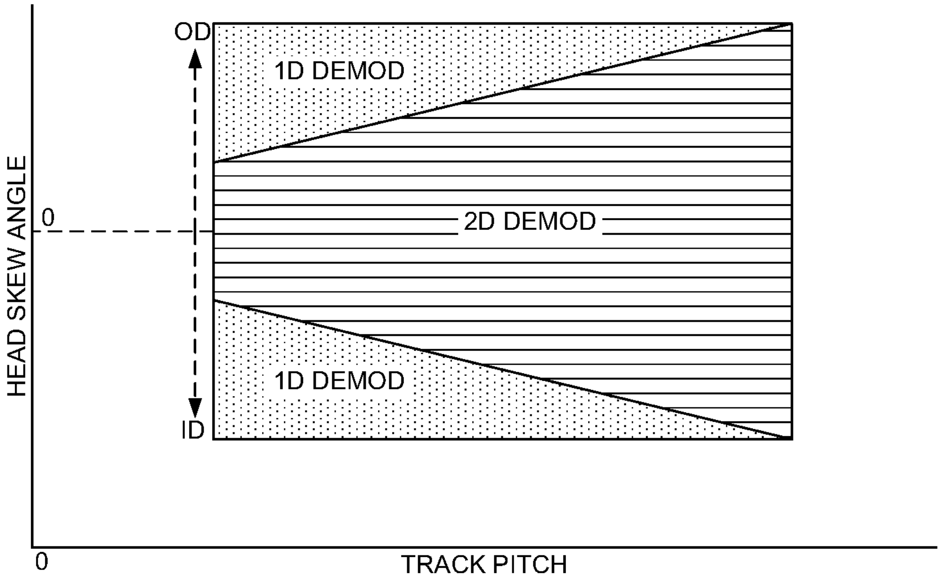
FIG. 5 illustrates the extent that the two-dimensional demodulation algorithm may be used to detect data recorded on the disk relative to the skew angle of the head and the track pitch of the data tracks according to an embodiment.

In an embodiment illustrated in FIG. 5, the number of data tracks spanned by the 2D bands depends on the track pitch (track width) of the data tracks (for a given configuration of the read elements). As the track pitch decreases leading to narrower data tracks, the width of the 2D bands decreases as shown in FIG. 5. Accordingly, in one embodiment the disk drive may be analyzed to determine an optimal track pitch that maximizes the capacity of each disk surface. That is, given the 2D bands enable a higher recording density than the 1D bands, there may be an optimal track pitch shown in FIG. 5 that optimizes the width of 2D and 1D bands to achieve the maximum capacity.

Figure 6:
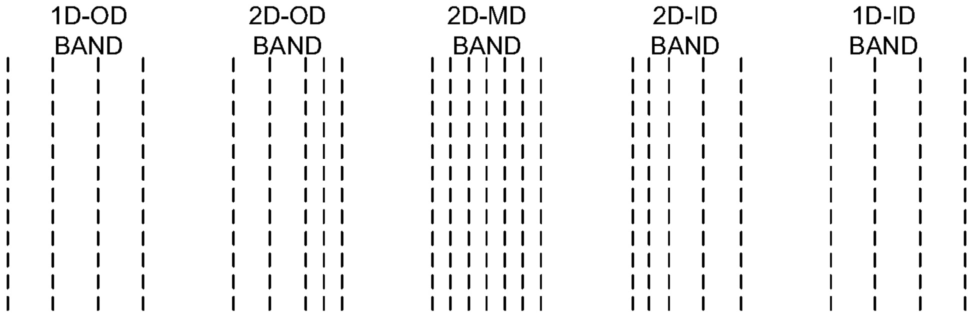
FIG. 6 illustrates an embodiment where the radial density of the data tracks is varied relative to the skew angle of the head and whether a one-dimensional or two-dimensional algorithm may be used to detect data recorded on the disk.

In one embodiment, the track pitch within the 2D bands may increase as the head nears each of the 1D bands. Referring to the example of FIG. 6, the 2D-MD BAND may comprise data tracks having the smallest track pitch, whereas the 2D-OD BAND and the 2D-ID BAND may comprise data tracks with a track pitch that increases toward the outer diameter and inner diameter of the disk, respectively. Increasing the track pitch toward the boundaries of the 2D bands may enable the 2D bands to span a greater number of data tracks, which may further optimizing the capacity of each disk surface. In the example of FIG. 6, the data tracks in the 1D bands comprise the largest track pitch since the one-dimensional demodulation algorithm does not compensate for ITI from an adjacent data track.

Figures 7A, 7B:
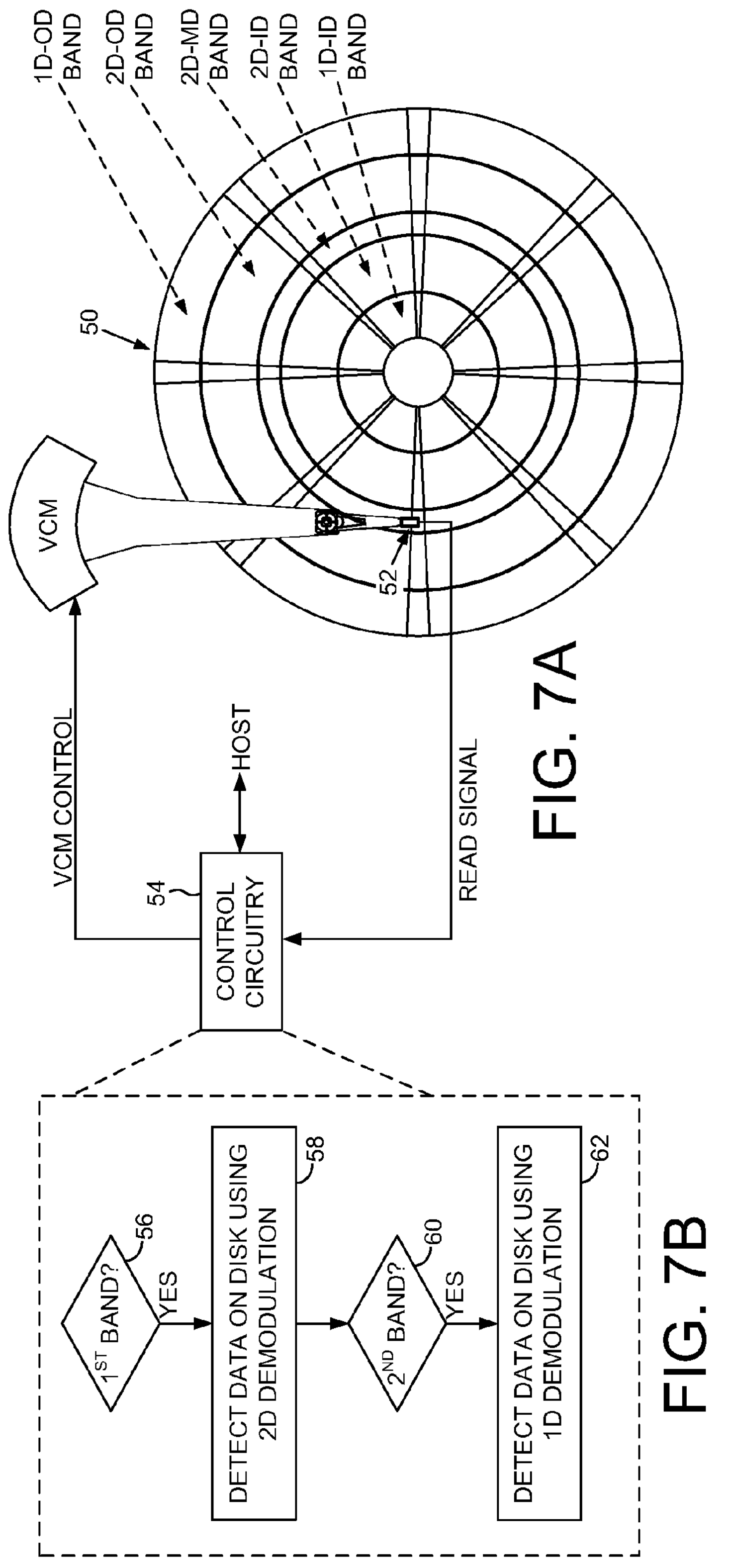
FIG. 7A shows a disk drive according to an embodiment comprising a disk having a plurality of tracks accessed using a one-dimensional or two-dimensional demodulation algorithm.
FIG. 7B is a flow diagram according to an embodiment wherein when the head is within a first radial band of the disk, data recorded on the disk is detected using a two-dimensional demodulation algorithm, and when the head is within a second radial band of the disk, data recorded on the disk is detected using a one-dimensional demodulation algorithm.

FIG. 7A shows a disk drive according to an embodiment comprising a disk 50 comprising a plurality of tracks, and a head 52 comprising at least two read elements (e.g., as shown in FIG. 2C). The disk drive further comprises control circuitry 54 configured to execute the flow diagram of FIG. 7B, wherein when the head is within a first radial band of the disk (block 56) such as the 2D-OD BAND, data recorded on the disk is detected by processing a first read signal generated by the first read element and by processing a second read signal generated by the second read element using a two-dimensional demodulation algorithm (block 58). When the head is within a second radial band of the disk different from the first radial band (block 60) such as the 1D-OD BAND, data recorded on the disk is detected by processing the first read signal using a one-dimensional demodulation algorithm (block 62).

Although the figures in the above embodiments show the read elements as having a width proximate the width of a data track, in an alternative embodiment one or more of the read elements may have a width that spans less than a full data track (e.g., eighty percent of a data track), and in other embodiments one or more of the read elements may have a width that spans more than a full data track. In one embodiment, the read elements of the head 20 may be fabricated with relative radial and/or down-track offsets that may be selected based on a target width for the data tracks (i.e., a target track pitch). In another embodiment, the relative radial and/or down-track offsets of the read elements may be measured by the control circuitry 24 executing a suitable calibration procedure, and then the target track pitch selected based on the measured offsets. In one embodiment, the target track pitch may also be selected based on the width of the write element, and in another embodiment the data tracks may be written in a shingled manner so that the target track pitch may be selected based on an amount of overlap of the shingled data tracks.

Figures 8A, 8B, 8C:
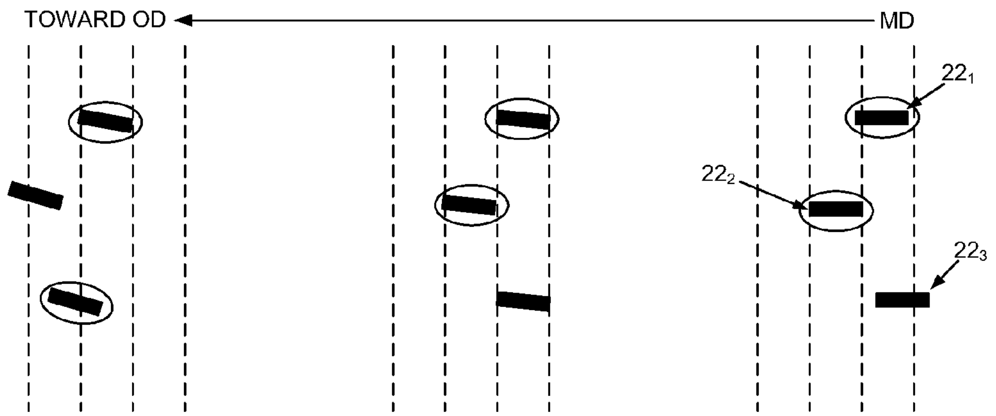
FIGS. 8A-8F show an embodiment where the first and third read elements may be fabricated with a relative radial offset (intentionally or due to manufacturing tolerances).
Figures 8D, 8E, 8F:
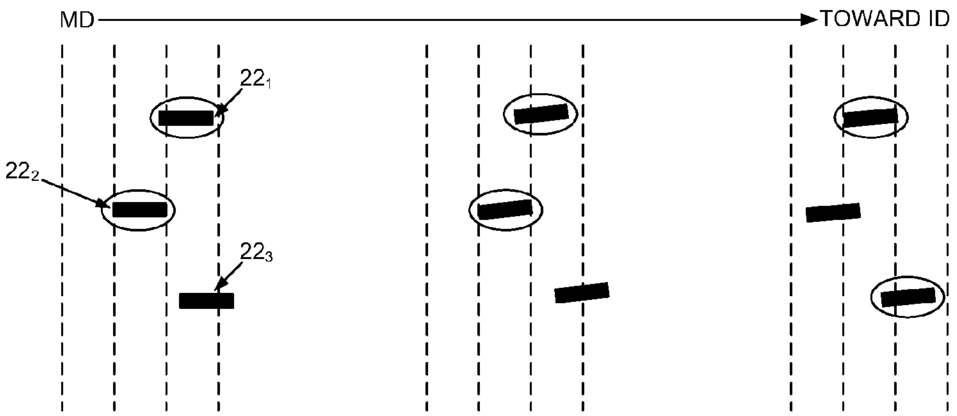

FIG. 2C shows an embodiment wherein the head 20 comprises three read elements fabricated with a particular configuration. However, other embodiments may employ a head 20 having more than three read elements fabricated in any suitable configuration and utilized in any suitable toggling sequence as the skew angle changes when the head 20 moves radially over the disk. FIGS. 8A-8F show an embodiment where the first and third read elements $\mathbf{22}_1$ and $\mathbf{22}_3$ may be fabricated with a relative radial offset (intentionally or due to manufacturing tolerances). In this embodiment, the first read element $\mathbf{22}_1$ may be substantially aligned down-track with the third read element $\mathbf{22}_3$ when the head 20 reaches a radial location of the disk 16 toward the OD as shown in FIG. 8B (as compared to near the ID as in the example of FIG. 2C). Also in one embodiment when the first and third read elements comprise a relative radial offset, the radial bands for employing either one-dimensional or two-dimensional demodulation may be asymmetric as compared to the symmetric example shown in FIG. 5.

In one embodiment, when data recorded on the disk is unrecoverable using a first two of the read elements, the control circuitry 24 may execute a retry operation using a different two of the read elements. Referring to the example of FIG. 3A, the control circuitry 24 may select read elements $\mathbf{22}_2$ and $\mathbf{22}_3$ when attempting to detect data in data track 44B during a first disk revolution, and if that fails, the control circuitry 24 may select read elements $\mathbf{22}_1$ and $\mathbf{22}_2$ to detect data during a retry revolution of the disk. In one embodiment, the control circuitry 24 may jog the read elements by a radial offset when selecting a different two of read elements for a retry operation. Referring to the example of FIG. 8A, if a read operation fails using read elements $\mathbf{22}_1$ and $\mathbf{22}_2$, during a retry revolution of the disk the control circuitry 24 may jog the read elements and then attempt to detect data in the same data track using a different two of read elements (e.g., read elements $\mathbf{22}_1$ and $\mathbf{22}_3$).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:

a disk comprising a plurality of tracks;

a head comprising at least three read elements including a first read element, a second read element, and a third read element; and control circuitry configured to:

when the head is within a first radial band of the disk, detect data recorded on the disk using the first read element and the second read element; and when the head is within a second radial band of the disk different from the first radial band, detect data recorded on the disk using the first read element and the third read element, wherein when the head is over approximately a middle diameter of the disk, the first read element is substantially aligned down-track with the third read element and the second read element is offset radially from the first read element and the third read element by at least half a width of the second read element.

2. The disk drive as recited in claim 1, wherein the control circuitry is further configured to read data from the disk using the first read element and the third read element when the head is within a third radial band of the disk, wherein:

the first radial band spans a plurality of middle diameter tracks;

the second radial band spans a plurality of outer diameter tracks; and the third radial band spans a plurality of inner diameter tracks.

3. The disk drive as recited in claim 1, wherein when the head is within the first radial band the control circuitry is configured to:

position the first read element at least partially over a first track;

position the second read element at least partially over a second track; and process a first read signal generated by the first read element and a second read signal generated by the second read element to detect data recorded in at least one of the first track and the second track.

4. The disk drive as recited in claim 3, wherein when the head is within the first radial band the control circuitry is configured to process the first read signal and the second read signal to detect data recorded in one of the first track and the second track using a two-dimensional demodulation algorithm.

5. The disk drive as recited in claim 4, wherein when the head is within a third radial band of the disk outside one of the first radial band and the second radial band, the control circuitry is configured to process a read signal generated by the first read element to detect data recorded in a third track using a one-dimensional demodulation algorithm.

6. The disk drive as recited in claim 4, wherein when the head is within the first radial band the control circuitry is configured to process the first read signal and the second read signal to detect data recorded in both the first track and the second track.

7. The disk drive as recited in claim 1, wherein when the head is over approximately the middle diameter of the disk, the first read element is substantially aligned down-track with the third read element and the second read element is offset radially from the first read element and the third read element by approximately a full width of the second read element.

8. A method of operating a disk drive, the method comprising:

when a head is within a first radial band of a disk, detecting data recorded on the disk using a first read element and a second read element; and when the head is within a second radial band of the disk different from the first radial band, detecting data recorded on the disk using the first read element and a third read element, wherein when the head is over approximately a middle diameter of the disk, the first read element is substantially aligned down-track with the third read element and the second read element is offset radially from the first read element and the third read element by at least half a width of the second read element.

9. The method as recited in claim 8, further comprising reading data from the disk using the first read element and the third read element when the head is within a third radial band of the disk, wherein:

the first radial band spans a plurality of middle diameter tracks;

the second radial band spans a plurality of outer diameter tracks; and the third radial band spans a plurality of inner diameter tracks.

10. The method as recited in claim 8, wherein when the head is within the first radial band the method further comprises:

positioning the first read element at least partially over a first track;

positioning the second read element at least partially over a second track; and processing a first read signal generated by the first read element and a second read signal generated by the second read element to detect data recorded in at least one of the first track and the second track.

11. The method as recited in claim 10, wherein when the head is within the first radial band the method further comprises processing the first read signal and the second read signal to detect data recorded in one of the first track and the second track using a two-dimensional demodulation algorithm.

12. The method as recited in claim 11, wherein when the head is within a third radial band of the disk outside one of the first radial band and the second radial band, the method further comprises processing a read signal generated by the first read element to detect data recorded in a third track using a one-dimensional demodulation algorithm.

13. The method as recited in claim 11, wherein when the head is within the first radial band the method further comprises processing the first read signal and the second read signal to detect data recorded in both the first track and the second track.

14. The method as recited in claim 8, wherein when the head is over approximately the middle diameter of the disk, the first read element is substantially aligned down-track with the third read element and the second read element is offset radially from the first read element and the third read element by approximately a full width of the second read element.

15. A disk drive comprising:

a disk comprising a plurality of tracks;

a head comprising at least three read elements including a first read element, a second read element, and a third read element; and control circuitry configured to:

select the first read element and the second read element to detect first user data recorded on the disk when the head is at a first radial location over the disk, wherein the third read element is not used to detect the first user data; and select the second read element and the third read element to detect second user data recorded on the disk when the head is at a second radial location over the disk different from the first radial location, wherein the first read element is not used to detect the second user data.

16. The disk drive as recited in claim 15, wherein:

the first user data is the same as the second user data;

the first radial location corresponds to a first read operation during a first revolution of the disk; and the second radial location corresponds to a retry read operation during a second revolution of the disk.

17. The disk drive as recited in claim 15, wherein:

the first radial location is within a first radial band of the disk; and the second radial location is within a second radial band of the disk.

18. The disk drive as recited in claim 17, wherein when the head is within the first radial band the control circuitry is configured to:

position the first read element at least partially over a first track;

position the second read element at least partially over a second track; and process a first read signal generated by the first read element and a second read signal generated by the second read element to detect the first user data recorded in at least one of the first track and the second track.

19. The disk drive as recited in claim 18, wherein when the head is within the first radial band the control circuitry is configured to process the first read signal and the second read signal to detect the first user data recorded in one of the first track and the second track using a two-dimensional demodulation algorithm.

20. A method of operating a disk drive, the method comprising:

selecting a first read element and a second read element to detect first user data recorded on a disk when a head is at a first radial location over the disk, wherein a third read element is not used to detect the first user data; and selecting the second read element and the third read element to detect second user data recorded on the disk when the head is at a second radial location over the disk different from the first radial location, wherein the first read element is not used to detect the second user data.

21. The method as recited in claim 20, wherein:

the first user data is the same as the second user data;

the first radial location corresponds to a first read operation during a first revolution of the disk; and the second radial location corresponds to a retry read operation during a second revolution of the disk.

22. The method as recited in claim 20, wherein:

the first radial location is within a first radial band of the disk; and the second radial location is within a second radial band of the disk.

23. The method as recited in claim 22, wherein when the head is within the first radial band the method further comprises:

positioning the first read element at least partially over a first track;

positioning the second read element at least partially over a second track; and processing a first read signal generated by the first read element and a second read signal generated by the second read element to detect the first user data recorded in at least one of the first track and the second track.

24. The method as recited in claim 23, wherein when the head is within the first radial band the method further comprises processing the first read signal and the second read signal to detect the first user data recorded in one of the first track and the second track using a two-dimensional demodulation algorithm.

* * * * *